Figure 1:
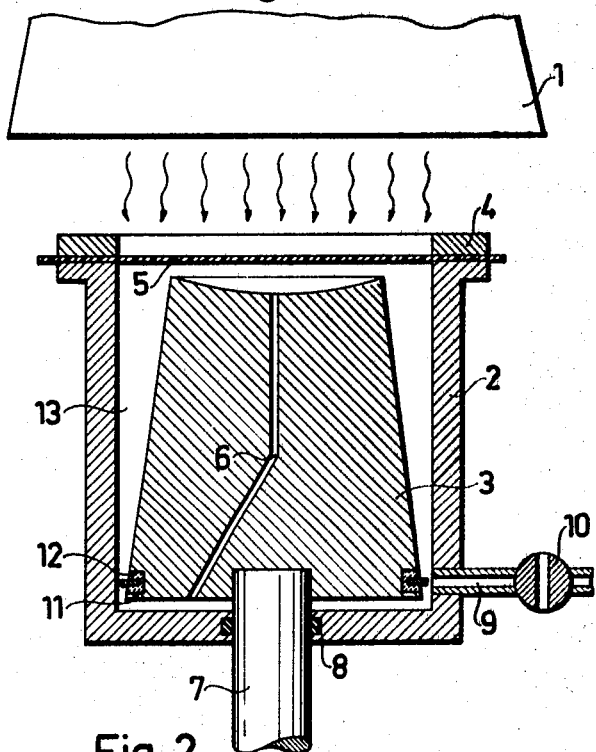

United States Patent

[11] 3,608,016

| [72] | Inventors | Sven Nils Hakan Holmstrom Loberod; Jan-Erik Olsen, Lund, both of Sweden |
|---|---|---|
| [21] | Appl. No. | 794,257 |
| [22] | Filed | Jan. 27, 1969 |
| [45] | Patented | Sept. 21, 1971 |
| [73] | Assignee | AB Tetra Pak Lund, Sweden |
| [32] | Priority | Feb. 7, 1968 |
| [33] | | Sweden |
| [31] | | 1611/68 |

[54] METHOD OF FORMING AND PRODUCING PREFERABLY CUP-SHAPED HOLLOW BODIES BY DRAWING A MATERIAL CAPABLE OF BEING FORMED BY HEAT
2 Claims, 5 Drawing Figs.

[52] U.S. Cl. .................................................... 264/89, 18/19 F, 264/92, 264/163, 264/292
[51] Int. Cl. ........................................................B29c 17/04, B29c 17/10
[50] Field of Search............................................ 264/88, 89, 90, 92, 292, 163; 18/19 D; 18/19 F

[56] References Cited
UNITED STATES PATENTS

| 2,830,818 | 4/1958 | Otto .............................. | 264/92 X |
| 2,953,814 | 9/1960 | Mumford ...................... | 264/163 X |
| 3,137,747 | 6/1964 | Kline ............................. | 264/92 |
| 3,207,821 | 9/1965 | Jones-Hinton et al. ........ | 264/89 X |
| 3,240,851 | 3/1966 | Scalora.......................... | 264/163 X |
| 3,337,666 | 8/1967 | Wilkins ......................... | 264/97 |

FOREIGN PATENTS

| 930,722 | 7/1963 | Great Britain................ | 264/90 |
| 1,359,686 | 3/1964 | France .......................... | 18/19 F |

Primary Examiner—Robert F. White
Assistant Examiner—J. H. Silbaugh
Attorney—Pierce, Scheffler and Parker ABSTRACT: Cup-shaped hollow bodies formed by clamping a sheet of thermoplastic material over a closed space having a mandrel therein and heating the sheet and then moving the mandrel against the heated sheet to deform same and form the hollow bodies. Provisions are made for making the walls of the body substantially uniform and for severing the hollow body from the unused sheet of material.

INVENTORS
Sven Nils Håkan Holmström
Jan-Erik Olsén

By
Pierce, Schiffler & Parker
Attorneys

PATENTED SEP21 1971 3,608,016
SHEET 2 OF 2
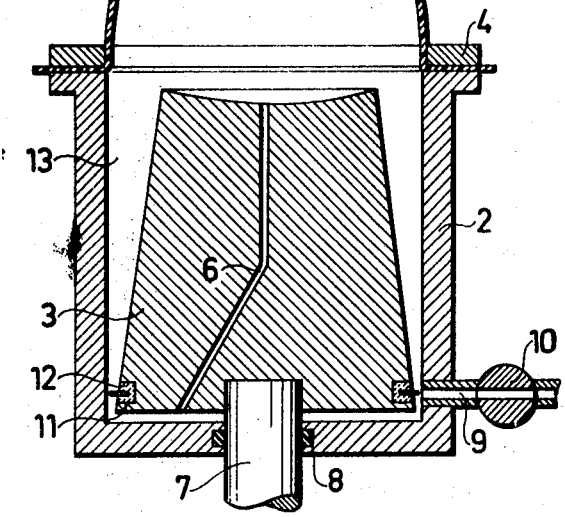
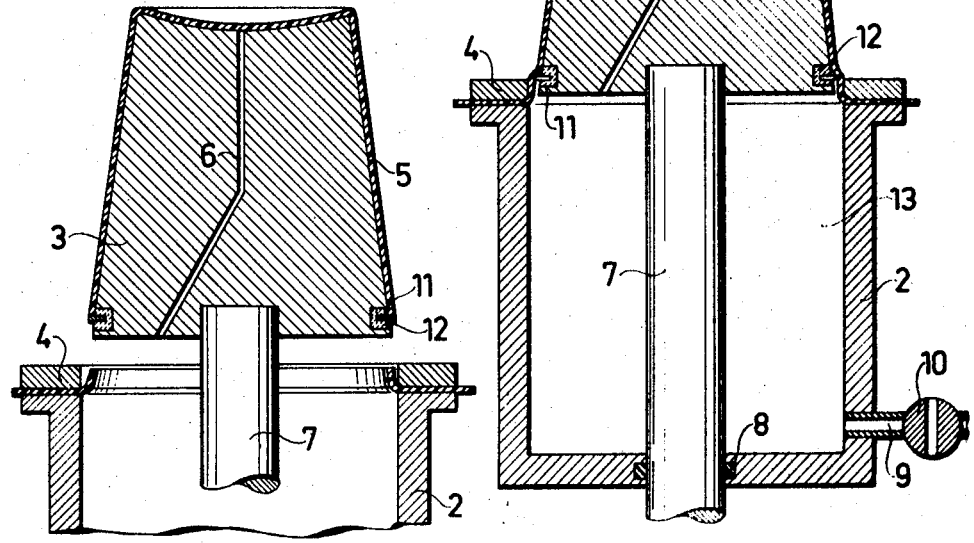
INVENTORS
Sven Nils Håkan Holmström
Jan-Erik Olsén
By Pierce, Scheffler & Parker
Attorneys

METHOD OF FORMING AND PRODUCING PREFERABLY CUP-SHAPED HOLLOW BODIES BY DRAWING A MATERIAL CAPABLE OF BEING FORMED BY HEAT

This invention is concerned with a method of forming and producing cup-shaped hollow bodies by drawing a material, e.g. plastic material, that is capable of being formed by heat.

Cup-shaped containers are often used within packaging technology for packaging consumer goods such as mayonnaise dairy products, jam etc. Development of plastics technology has resulted in packaging containers of this nature, which earlier on were mostly made of glass, being made of plastic materials nowadays to a large extent.

A number of methods have been developed for producing such hollow bodies, the most important of which are probably inflation of a plastic tube softened by heating, injection moulding of plastic materials in a die, expansion in a die of processed plastic granules that are capable of being foamed, and deep-drawing of a plastic film which has been softened by the application of heat.

The deep-drawing method is probably the quickest as far as production technology is concerned, which is why this method can be used economically in the production of packaging containers of relatively slight wall thickness. When packaging containers of greater wall thickness are to be produced, it is probable that the inflation method or one of the moulding methods are to be preferred.

The normal way of producing deep-drawn hollow bodies is to draw down into a mould, by suction positive pressure, a plastic film softened by heating, the plastic film, while undergoing plastic deformation, being made to adhere accurately to the inside of the mould. In order to make possible such accurate adhesion to the mould, a number of ducts opening into the surface of the mould are mostly provided, such ducts being in contact with a source of vacuum that is brought into operation, each time that drawing is to be carried out, by means of a valve arrangement governed by regulating equipment.

The difficulty which is associated with the deep-drawing procedure according to the above method is that the wall thickness of the deep-drawn article exhibits wide variations. It is true that these variations in thickness can to a certain extent be compensated for by uneven and selective heating of the plastic material prior to the deep-drawing operation, but this method of compensation has been found comparatively difficult to master.

The above drawbacks of the deep-drawing process can however be avoided by the method in accordance with the invention, which is characterized by a film or disc of the material to be formed being stretched and clamped like a membrane over the open end of an otherwise closed space in such a way as to form an airtight seal, and by the material that is capable of being formed by heat being then heated up to plasticity by means of a radiant heat source directed towards the membrane; by the membrane, by means of a mandrel that is capable of movement within the closed system and whose front portion is shaped in such a way that its outer surface corresponds to the inner surface of the above hollow body, being drawn, while subjected to plastic deformation, to the desired drawing depth through the mandrel being moved towards the membrane and out of the above space, whereupon the stretched membrane tightly adheres to the outside of the mandrel as a result of the pressure difference set up between the inside of the space and the surroundings owing to the increase in the volume of the space when the membrane is stretched.

The invention will now be described by reference to the attached diagrammatic drawings, of which FIGS. 1-5 show a device for carrying out of the method in accordance with the invention.

The device shown in FIG. 1 and the following FIGS. comprises a cylinder 2, one of whose ends has a base while its other end is open. A film 5 of material that is capable of being plasticized by heat, such as polystyrene or polyvinylchloride, is stretched over the open end of the cylinder 2. Film 5 is stretched like a membrane with the aid of a tensioning ring 4 which causes the film 5 to be pressed against and to be held on to the upper edge of the cylinder 2 in such a way as to form an airtight seal. There is fitted in the cylinder 2 a mandrel 3 which in this instance is shaped like a truncated cone, the smaller end surface of which is slightly concave. The mandrel 3 has an evacuation duct 6 which has its ends at the upper and lower end surfaces respectively of the mandrel, and the mandrel 3 is capable of being operated by a rod 7 which can move longitudinally through a hole in the end wall of the cylinder 2, there being fitted between the hole and the rod 7 a sealing ring 8.

A duct 9, through which gas under pressure can be introduced into the space 13 via a valve 10, is connected to the space 13 defined by the cylinder 2 and the membrane 5.

The mandrel 3 has further at its lower edge a ring-shaped flange 12 of an electrically resistant material. The flange 12 is situated in a groove 11 in which there is a thermally and electrically insulating material, e.g. mica. In order that it should be possible for an electric current to be conducted through the ring 12, this is cut and its two ends are connected to a source of electricity which is arranged so as to emit electrical impulses of high amplitude.

A radiant heat source 1 is fitted up in such a way that it can be positioned centrally above the membrane 5 of the material capable of being formed by heat which is stretched over the upper end of the cylinder 2.

The forming process is carried out by a roundel or part of a strip being stretched between the upper end of the cylinder 2 and the tensioning ring 4, after which the radiant heat source 1, in the way shown in FIG. 1, is placed over the cylinder 2 in such a way that the roundel or strip of material, capable of being softened by heat, which is stretched over it like a membrane is heated to plasticity.

Figure 2:
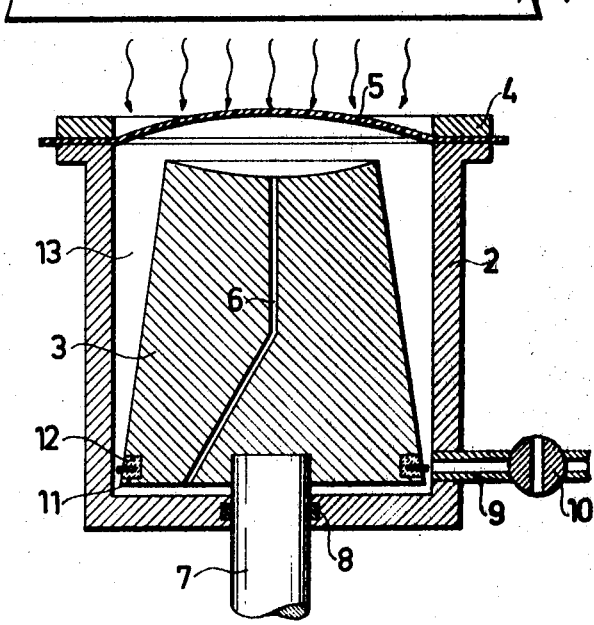

Since not only the material that is capable of being softened by heat but also the air contained within the space 13 is heated by radiation form the heat source 1, the air in the space 13 will expand at the same time as the membrane 5 becomes plastic, which results in the membrane 5 assuming a domed shape as shown in FIG. 2. The central portions of the membrane 5 will therefore be situated nearer to the heat source, which causes these portions to be heated to a higher temperature than the portions of the membrane around its periphery. Such a heat distribution is desirable since the greatest tensile stresses during the subsequent drawing operation will be set up in the peripheral portions of the membrane, or in other words, the heat distribution contributes to the completed product having a uniform wall thickness.

When the membrane 5 has been heated sufficiently, the heat source 1 is removed in a way shown in FIG. 3. The valve 10 is opened and brings the space 13, through the duct 9, into communication with a source of gas under pressure.

The increase of pressure aimed at is naturally dependent upon the plasticity of the membrane 5, but in normal circumstances the provision of a pressure increase in the order of 0.1–0.2 atmospheres should be sufficient to inflate the membrane 5 to the shape of a bubble, as shown in FIG. 3. The vale 10 is closed after the membrane 5 has been blown up, after which the mandrel 3 is quickly pushed upwards by means of the rod 7 to a position shown in FIG. 4. The plastic membrane 5 will be stretched further in this way, and this will cause the volume of the space 13 to become considerably larger than the corresponding volume in FIG. 3. Owing to this increase in volume, the pressure inside the cylinder will drop so much that it will be below atmospheric, and this will cause the plastic membrane 5 to adhere tightly to the outside of the mandrel. In order that there should be no air pocket left at the upper side of the mandrel 3, there is provided an evacuation duet 6 between the top and bottom of the mandrel. The mandrel 3 is retained in the position shown in FIG. 4 long enough for the thermoplastic material to cool down and to become stable, which on account of the slight wall thickness of the material and its contact with the mandrel 3 takes place in a very short time (in the order of 0.05–0.5 second).

After the plastic material has become stable, an electrical impulse is sent through the flange 12 which will temporarily be heated to a high temperature. Simultaneously with the heating of the flange 12 or immediately thereafter, the upward movement of the mandrel 3 is continued, which results in the material formed being cut away with the aid of the heated flange 12, as shown in FIG. 5.

The cup thus formed can now be blown off the mandrel in the conventional manner, or if the hollow body is to constitute the lining in another container, e.g. a foam plastic cup, it can be directly inserted into this.

In accordance with the method specified in the invention, hollow bodies with extremely small wall thicknesses can be produced, but since these thin-walled container bodies have very little mechanical stiffness, they can, as mentioned above, be used to advantage as lining in e.g. cardboard or foam plastic cups. The mechanical stiffness of the cardboard or foam plastic will hereby be combined with the gas and liquid-tight properties of the lining.

The constructional example shown here is only intended to illustrate a method of construction in accordance with the invention, and it is naturally possible, within the framework of the idea underlying the invention, to modify the shape of the mandrel in any way desired. It is in certain cases unnecessary to resort to the inflation into a bubble of the membrane 5 as shown in FIG. 3, but since this inflation contributes to the attainment of an even wall thickness, it is an advantage to make use of this stage of the operation, at least in connection with the drawing of elongated articles.

We claim:

1. A method for forming hollow bodies from thermoplastic material comprising the steps of stretching and clamping a sheet of said material over the open end of a cylindrical member closed at its opposite end to form an airtight space within said cylindrical member, the airtight space containing a movable mandrel therein, said mandrel having a passage connecting the forward end thereof with the rear thereof, directing radiant heat toward the exposed outer surface of said sheet to plasticize the same, the radiant heat heating and expanding the air within the airtight space so that expansion thereof causes the sheet of material to bulge outwardly from the end of the cylindrical member, the central area of the sheet being thus heated to a higher temperature than the periphery thereof so as to contribute to uniform wall thickness when the sheet is subsequently shaped by the mandrel, moving the mandrel out of the cylindrical member toward and against the inner surface of the plasticized sheet of material to a position outside the cylindrical member to shape the plasticized sheet to conform with the outer surface of the mandrel, the mandrel when moved outwardly from the cylindrical member, causing the air pressure to be decreased within the airtight space to extent extent such that the sheet of plasticized material is drawn toward the mandrel by virtue of the passage in the mandrel and to be shaped thereby to form a hollow body, allowing the shaped plasticized material to cool sufficiently to become stable and self-supporting, heating the periphery of the shaped hollow body on said mandrel, where it adjoins the clamped material, to the melting point and then moving the mandrel further outwardly from the cylindrical member to sever the periphery of the hollow body from the clamped material and finally removing the separated shaped hollow body from the mandrel.

2. A method as claimed in claim 1, and further comprising the step of increasing the air pressure within the airtight space after the outward bulge has formed so as to inflate the sheet to a domed shape before moving the mandrel toward and against the plasticized sheet of material.

UNITED STATES PATENT OFFICE
CERTIFICATE OF CORRECTION

Patent No. 3,608,016     Dated September 21, 1971

Inventor(s) HOLMSTROM Sven Nils Hakan/and Jan-Erik Olsen

It is certified that error appears in the above-identified patent and that said Letters Patent are hereby corrected as shown below:

Claim 1, lines 21 and 22, cancel "ex-tent"

and insert --- an ---

Signed and sealed this 8th day of February 1972.

(SEAL)
Attest:

EDWARD M. FLETCHER, JR.
Attesting Officer

ROBERT GOTTSCHALK
Commissioner of Patents